United States Patent
Glogovcsan, Jr.

(10) Patent No.: US 6,367,772 B1
(45) Date of Patent: Apr. 9, 2002

(54) VOLUMETRIC EFFICIENCY ENHANCING THROTTLE BODY

(76) Inventor: Julius A. Glogovcsan, Jr., 9302 Livernois Rd., Houston, TX (US) 77080

( * ) Notice: Subject to any disclaimer, the term of this patent is extended or adjusted under 35 U.S.C. 154(b) by 0 days.

(21) Appl. No.: 09/655,291

(22) Filed: Sep. 5, 2000

(51) Int. Cl.$^7$ .................................................. F16K 1/22
(52) U.S. Cl. ......................... 251/305; 251/123; 251/275
(58) Field of Search ............................... 251/123, 295, 251/305

(56) References Cited

U.S. PATENT DOCUMENTS

| | | | |
|---|---|---|---|
| 3,234,966 A | * | 2/1966 | Klose |
| 3,298,677 A | * | 1/1967 | Anderson |
| 3,521,857 A | * | 7/1970 | Over |
| 3,675,681 A | * | 7/1972 | Obermaier ............... 137/625.3 |
| 3,721,431 A | | 3/1973 | Landrum |
| 3,960,177 A | * | 6/1976 | Baumann ............... 137/625.31 |
| 4,078,025 A | | 3/1978 | Kato |
| 4,305,892 A | | 12/1981 | Hallberg |
| 4,329,964 A | | 5/1982 | Morris |
| 4,379,096 A | | 4/1983 | Yokoyama et al. |
| 4,387,063 A | | 6/1983 | Pontoppidan et al. |
| 4,539,163 A | | 9/1985 | Sakurai et al. |
| 4,966,735 A | | 10/1990 | LoRusso |
| 5,480,123 A | * | 1/1996 | Bey ............................ 251/305 |

* cited by examiner

*Primary Examiner*—Joseph A. Kaufman
*Assistant Examiner*—D. Austin Bonderer
(74) *Attorney, Agent, or Firm*—Harrison & Egbert

(57) ABSTRACT

A throttle apparatus having a throttle body with an air passageway extending therethrough, an axle rotatably mounted in the throttle body, a disk affixed centrally to the axle so as to pivot relative to a rotation of the axle, and a channel formed in a wall of the throttle body and having an end separate from and adjacent to the disk. The channel is formed on the wall in at least one side of the disk. The axle is adapted to rotate in relation to a movement of an accelerator pedal. The axle extends across the air passageway transverse to a longitudinal axis of the passageway. The disk is movable between a first position adapted to block air flow through the passageway and a variable second position adapted to allow air flow through the passageway. A seat is formed in the passageway of the throttle body and extends radially inwardly from the wall. The seat extends circumferentially around the disk in the first position. The channel can include a plurality of channels which are formed in the wall of the air passageway.

14 Claims, 4 Drawing Sheets

VOLUMETRIC EFFICIENCY ENHANCING THROTTLE BODY

TECHNICAL FIELD

The present invention relates to carburetors and throttle bodies as used in internal combustion engines. More particularly, the present invention relates to throttle bodies that are adapted to pass air to a manifold associated with the engine. Additionally, the present invention relates to modifications of the air passageways found in the throttle body so as to obtain greater volumetric efficiency at low r.p.m.'s, for the engine, compared to current standard designs.

BACKGROUND ART

Conventional throttle bodies are mounted within the air intake stream of an internal combustion engine. Typically, a butterfly valve is employed to control the amount of air flow through the throttle body and consequently, the entire r.p.m. speed. The butterfly valve is mounted on a throttle shaft, which is, in turn, coupled to the vehicle accelerator pedal and possibly other actuating mechanisms.

Present internal combustion engines that utilize liquid fuel will typically utilize a throttle mechanism which is formed of an external block containing one or more cylindrical passageways.

These passageways are subjected to a constrictive flow by a thin cylindrical solid disk contained within the cylindrical passageway. The disk is on a centrally located axle located at the mid-point of and center-line transverse to the passageway. The rotation of the axle/disk assemblage causes the passageways to be variably closed or opened in unison. Under normal operating conditions, aspirated air is allowed to flow through these passageways and introduced into the cylinders of the engine. The flow of aspirated air can be controlled by the rotation of the disk contained within the passageway. The amount of this aspirated air, relative to the subsequent injection of liquid fuel, determines what is normally termed volumetric efficiency. This capacity to fill a cylinder or cylinders, to the greatest amount possible with the optimum fuel/air mixture, determines the force engendered on the piston or pistons upon ignition of this mixture. Typically, at slow speeds or low r.p.m.'s, the volumetric efficiency of an engine is lower than that achieved at higher speeds. This occurs principally because of the high constriction of air flow due to the position of the disk in the air flow passageway of the throttle body mechanism. The rotation and position of the disk does not result in a linear increase in the area exposed to air flow. For example, ten degrees of rotation of the disk does not result in double the air flow as a rotation of only five degrees. When the disks are fully closed in the throttle body, it is considered to be in an "idle" position with aspirated air flow at a bare minimum. At opening, in present throttle bodies, the amount of aspirated air is very slowly increased. As opening continues, the amount of aspirated air is dramatically increased and, as a result, volumetric efficiency increases.

FIG. 1 illustrates a conventional throttle body 10 as used on an internal combustion engine. The throttle body assembly 10 includes a throttle body housing 12 which assembles into an air intake system for an internal combustion engine, not shown. The throttle body housing 12 includes air flow bores 14 and 16 through which intake air is directed during operation of the internal combustion engine. The output of the throttle body assembly 10 will direct air to the manifold of the internal combustion engine. From the manifold, air can be directed into the engine cylinders for mixture with the fuel.

In FIG. 2, it can be seen that the air flow bores 14 and 16 are closed by the use of disks 18 and 20, respectively. Disks 18 and 20 are affixed centrally to an axle 22 extending transversely across the longitudinal axis of the air flow bores 14 and 16. The rotation of the axle 22 will cause a corresponding rotation of each of the disks 18 and 20 so as to allow air flow through the bores 14 and 16, respectively.

In FIG. 3, there is shown a cross-sectional view of the air flow bore 14. It can be seen that the disk 18 is shown in a first position in which the outer periphery of the disk 18 rests against a seat 24 formed on the interior wall 26 of the throttle body 12. When the disk 18 has its periphery against the seat 24, the air flow bore 14 is closed so as to prevent air from passing therethrough. When the accelerator of the vehicle is pressed downwardly, the disk 18 will pivot about axle 22 so as to allow air flow to pass in the area beyond the periphery 28 of disk 18 and the wall 26 of the throttle body 12. The amount of rotation of the disk 18 will determine the amount of air that is possible to flow in the spaces between the periphery 28 of the disk 18 and the wall 26 of the throttle body 12.

In FIG. 3, it can be seen that the air flow bore 14 has a first section 30 and a second section 32 arranged on opposite sides of the disk 18. The wall 26 in section 30 is of substantially straight and even diameter extending to the seat 24. Similarly, the wall 34 in the second section 32 is substantially straight and uniform and extends from the seat 24.

In normal use, a volumetrically inefficient amount of air will flow past the disk when the disk 18 is rotated only with small angular deflection. As such, the engine will receive a volumetrically inefficient amount of air. Ultimately, when the disk 18 has rotated fully, the engine will run at an optimum volumetric efficiency at a predetermined operational speed.

Several problems have been associated with attempts to increase the diameter of the air flow bore 14 in the second section 32. Initially, the restrictions caused by the casting of the throttle body 12 will prevent any undue expansion of such air passageway. The relatively small diameter of the air flow bore 14 serves to create better transitions for the power train of the vehicle. Additionally, an increase in the diameter of the bore associated with the air flow passage is believed to create non-laminar flow and thus create an inefficiency in the delivery of air to the manifold.

In the past, various patents have issued relating to the delivery of air to the cylinders of a vehicle. In particular, U.S. Pat. No. 3,721,431, issued on Mar. 20, 1973 to P. Landrum, describes a fuel preparation system for a carburetor which utilizes an air supply conduit of predetermined dimensions communicating with each idle port of the carburetor with means for heating air passing through a conduit at predetermined temperature. Lateral openings in air supply conduits adjacent to the idle port receive fuel from the fuel supply passageway to supply heated mixture of fuel and air to the idle port.

U.S. Pat. No. 4,078,025, issued on Mar. 7, 1978 to T. Kato teaches a carburetor having an air port provided adjacent a slow port so as to supply air from the air port when fuel is supplied from the slow port in a slow speed operation of the engine. The air port is biased with respect to the slow port so that the supply of air from the air port is more rapidly reduced than the supply of fuel from the slow port in the transition region from a slow speed operation to the normal operating condition. This will compensate for a delay in the fuel supply from a main nozzle in the transition region.

U.S. Pat. No. 4,305,892, issued on Dec. 15, 1981 to I. H. Hallberg, describes a carburetor in which fuel is supplied to a pair of tubular members. These tubular members may be of equal or different diameters and are disposed across a housing opening through which air flows. The velocity of such air is controlled by a throttle valve or by a damper means. Each tubular member is constructed with a generally upwardly directed slot or fuel gap such that the air strips fuel therefrom. The throttle valve or damper may be of the iris type or of a type having a pair of vanes pivoted outwardly of the center thereof so as to initially open at the center thereof. At small throttle openings, air flowing to the engine is concentrated over the fuel gap of the lower member. This results in high air velocities at low air flow rates.

U.S. Pat. No. 4,329,964, issued on May 18, 1982 to G. Q. Morris, describes a carburetion system for metering liquid fuel for supply to an internal combustion engine. Metered liquid fuel is delivered through one branch of the metering system to the engine intake air downstream of the throttle at small and medium engine loads. The liquid fuel is delivered through the other branch to the engine intake air upstream of the throttle at large engine loads. The fuel flow is transitioned between the branches in an automatic manner and occurs in response to pressure differentials within the system. Fuel delivered to the engine intake air downstream of the throttle valve may be heated or otherwise treated to improve liquid fuel atomization or vaporization.

U.S. Pat. No. 4,379,096, issued on Apr. 5, 1983 to Yokoyama et al., describes a carburetor in which an air/fuel mixture is fed to each cylinder so as to maintain a uniform air/fuel ratio in the course of transit from the primary side to the secondary side of the carburetor. An independent secondary slow-running fuel system is provided for each cylinder and a secondary slow mixture path includes a pipe connected between a carburetor and a manifold.

U.S. Pat. No. 4,387,063, issued on Jun. 7, 1983 to Pontoppidan, et al. describes a carburetor having a main fuel supply system for normal running, which opens into a venturi in the induction passage of the carburetor. There is at least one auxiliary circuit for supplying a flow of air/fuel mixture for low speed and low-load operation of the engine. The mixture control for the circuits are carried by a distribution block arranged to be inserted and removably fixed in the part of the induction passage situated in the vicinity of a venturi.

U.S. Pat. No. 4,539,163, issued on Sep. 3, 1985 to Sakurai, et al. teaches a carburetor which includes an enrichment circuit having a port in the induction passage upstream of the idle position of the throttle valve and which is served by a fuel well. The discharge of the enrichment circuit is controlled by a throttle valve position responsive valve.

U.S. Pat. No. 4,966,735, issued on Oct. 30, 1990 to M. LoRusso, describes a non-leaking venturi carburetor which has a generally cylindrical bore into which are fitted removable liners. The inner liner surfaces are contoured as a venturi wherein a circular inlet section narrows down to a throat after which the outlet section generally expands in flow area. The fuel discharges into the venturi through a plurality of ports in the venturi wall. These ports are located around the periphery of the venturi and generally in the vicinity of the venturi throat.

It is an object of the present invention to provide a throttle apparatus which greatly improves the volumetric efficiency and thus, torque, of the engine at low speeds.

It is another object of the present invention to provide a throttle apparatus which boosts acceleration due to greater torque at low speeds.

It is a further object of the present invention to provide a throttle apparatus which greatly improves fuel economy.

It is another object of the present invention to provide a throttle apparatus which reduces the emission of hydrocarbons and other pollutants.

It is still another object of the present invention to provide a throttle apparatus which is easy to manufacture, easy to use and relatively inexpensive.

These and other objects and advantages of the present invention will become apparent from a reading of the attached specification and appended claims.

SUMMARY OF THE INVENTION

The present invention is a throttle apparatus that comprises a throttle body having an air passageway extending therethrough, an axle rotatably mounted in the throttle body and adapted to rotate in relation to a movement of the accelerator pedal, a disk affixed to the axle so as to pivot relative to the rotation of the axle, and a channel formed in a wall of the throttle body in one side of the disk. The disk is movable between a first position adapted to block the air flow through the passageway and a variable second position adapted to allow air flow through the passageway. The channel is formed in the wall of the throttle body so as to have an end separate from and adjacent to the disk when the disk is in the first position.

In the present invention, a seat is formed in the passageway of the throttle body. The seat extends radially inwardly from the wall. The seat extends circumferentially around the disk in the first position. The disk has a circular configuration and the seat has an annular configuration. The disk is in generally sealing contact with the seat in the first position. The channel has an end immediately extending from the seat.

The disk defines a first section and a second section of the air passageway when the disk is in the first position. The first section is adapted to receive the air flow prior to passing by the disk into the second section. The channel is preferably formed in the second section. In the preferred embodiment of the present invention, the channel comprises a plurality of channels extending longitudinally along the second section. The plurality of channels have a bottom extending into the wall. The second section has a greater cross-sectional area than the cross-sectional area of the first section. The plurality of channels are arranged in generally spaced parallel relationship to each other. In the preferred embodiment of the present invention, each of the plurality of channels has a similar cross-section. Also, the plurality of channels may be arranged halfway around or entirely around the air passageway of the second section.

In an alternative form of the present invention, the plurality of channels extend longitudinally along the first section so as to have an end adjacent to and separate from the disk when the disk is in the first position. In another alternative form of the present invention, the channels in the wall of the second section extend in a generally helical (or rifled) configuration.

The disk is angularly displaceable about the axle so as to allow a controlled amount of air flow through the space between a periphery of the disk and the wall of the air passageway. The arrangement of channels have a depth and size adapted to obtain a desired volumetric efficiency of an engine through which the air flow passes. The channels are configured to be parallel to a path of air flow past the disk.

DETAILED DESCRIPTION OF THE PRESENT INVENTION

Figure 1:
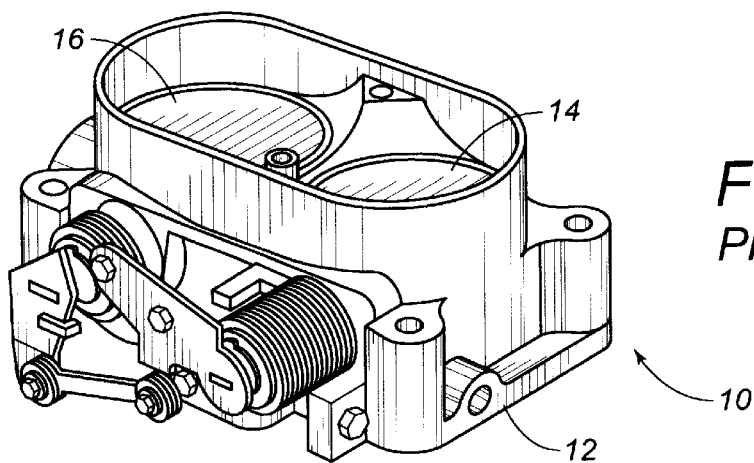
FIG. 1 is a perspective view of a conventional throttle of the prior art.
Figure 2:
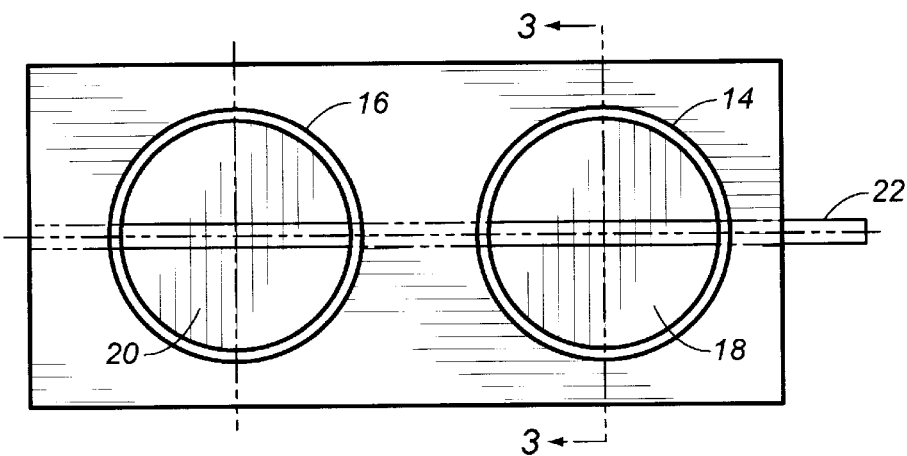
FIG. 2 is an end view showing the disks and air flow passageways associated with a conventional throttle body.
Figure 3:
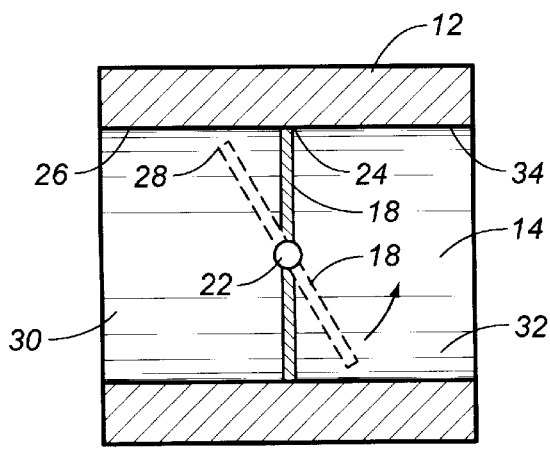
FIG. 3 is a cross-sectional view taken across lines 3—3 of FIG. 2 of the prior art.
Figure 4:
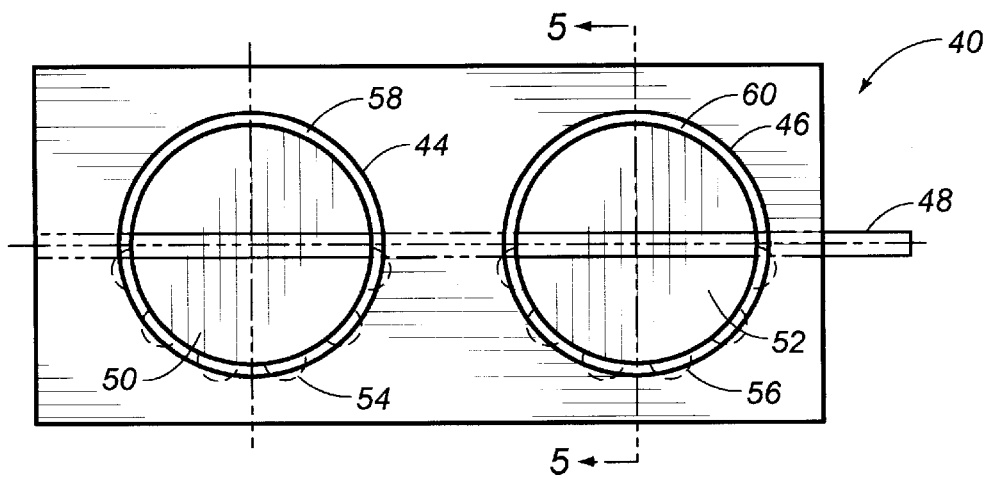
FIG. 4 is an end view of the throttle apparatus of the present invention.

Referring to FIG. 4, there is shown at 40 the throttle apparatus in accordance with the present invention. The throttle apparatus 40 includes a throttle body 42 having a first air passageway 44 and a second air passageway 46 extending therethrough. An axle 48 is rotatably mounted in the throttle body 42. The axle 48 is adapted to rotate in relation to a movement of an accelerator of a pedal of a vehicle. The axle 48 extends across the passageways 44 and 46 generally transverse to a longitudinal axis of such passageways 44 and 46. A disk 50 is affixed onto the axle 48 so as to pivot relative to a rotation of the axle 48. The disk 50 is mounted so as to open and close with respect to air passageway 44. Another disk 52 is mounted on axle 48 and associated with air passageway 46. The disks 50 and 52 are connected to axle 48 so as to pivot in coordination with each other. These disks are movable between a first position (as shown in FIG. 4) adapted to block an air flow through the respective passageways 44 and 46 and a variable second position adapted to allow air flow through such passageways. A channel 54 is formed in the wall of the throttle body 42 at the air passageway 44. Another channel 56 is formed in the wall of the throttle body 42 at the area of the air passageway 46. In the preferred embodiment of the present invention, these channels 54 and 56 are illustrated in broken line fashion so as to indicate that such channels 54 and 56 will be formed in the wall on one side of the respective disks.

In FIG. 4, it can be seen that disk 50 resides, in its closed position, on a seat 58. Seat 58 is formed in the passageway 44 of the throttle body 42 and extends radially inwardly from the wall of the passageway 44. The seat 58 extends circumferentially around the disk 50 in the first position. Similarly, a seat 60 is formed in the passageway 46 of the throttle body 42. Seat 60 will extend circumferentially around the disk 52. It can be seen that the disks 50 and 52 each have a circular configuration. The seats 58 and 60 each have an annular configuration. Each of the disks 50 and 52 will be in generally sealing contact with the respective seats 58 and 60 when the disks 50 and 52 are in their first position (the closed position).

Figure 5:
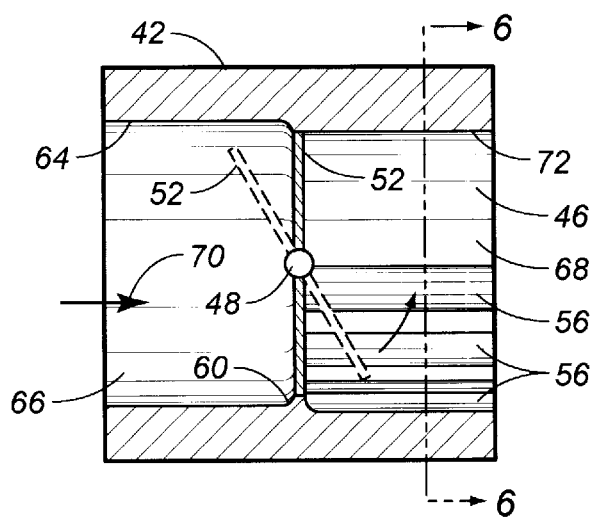
FIG. 5 is a cross-sectional view taken across lines 5—5 of FIG. 4.

FIG. 5 is a cross-sectional view showing the interior configuration of the passageway 46 within throttle body 42.

As can be seen, the disk 52 is shown in its first position in solid fashion. In this first position, a periphery 62 of disk 50 resides in its closed position upon the seat 60. The disk 52 is also illustrated, in broken line fashion, as being rotated about axle 48 so as to allow an air flow (indicated by the arrows) around the periphery of the disk 52 and within the wall 64 of the passageway 46.

In the closed position, the disk 52 will define a first section 66 and a second section 68 in the air flow passageway 46. The air flow passing through the passageway 46 will originate from the first section 66 of the air flow passageway 46. The air flow will pass in the direction of arrow 70.

Importantly, in the present invention, channel 56 is formed in the wall 72 of the second section 68. The channels 56 are of a pre-determined shape which will extend into the wall 72 for a desired depth and size. Each of the channels 56 are arranged in a longitudinally parallel and spaced relationship. In actuality, a plurality of channels 56 are formed in the wall 72 of the second section 68. In another embodiment of the present invention, a single large channel is used instead of the multiple smaller channels 56 shown in FIG. 5.

In normal operation, when the disk 52 is pivoted so as to assume the position shown in FIG. 5, the air flow into the second section 68 is dramatically increased because of the arrangement of the channels 56. When the disk 52 is pivoted, the channels will immediately allow a greater amount of air flow to escape from the area between the periphery of the disk 52 and the wall 72 of the second section 68. As such, the arrangement of the present invention will draw a much greater volume and density of air relative to a relatively small pivoting of the disk 52 about shaft 48.

Figure 6:
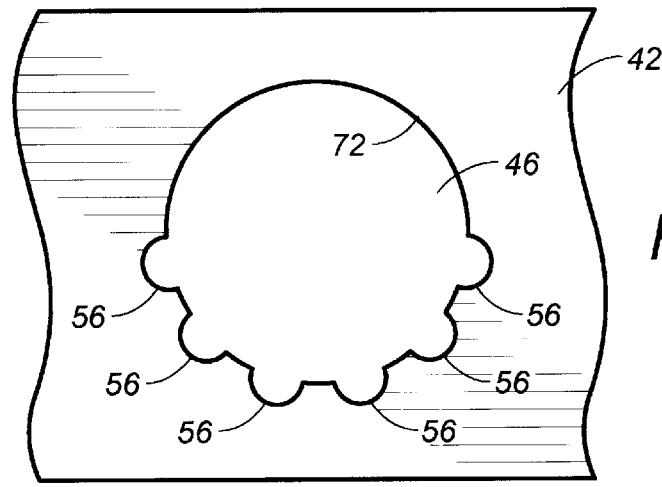
FIG. 6 is a cross-sectional view taken across lines 6—6 of FIG. 5.

FIG. 6 shows how the channels 56 are arranged within the wall 72 of throttle body 42. It can be seen that these channels 56 are semi-circular cuts made into the wall 72. In the embodiment of the present invention shown in FIG. 6, these channels 56 only extend half way around the circumference of the air flow passageway 46. However, the channels 56, if greater flow of air is required, can extend entirely around the air flow passageway 46. Additionally, the channels 56 can have a suitable width so as to extend entirely around the air flow passageway 46. The principal purpose of the present invention is that an immediately greater volume of air can pass in the space between the periphery of the disk 52 and the wall 72 of the second section 68 of air flow passageway 46.

Figure 7:
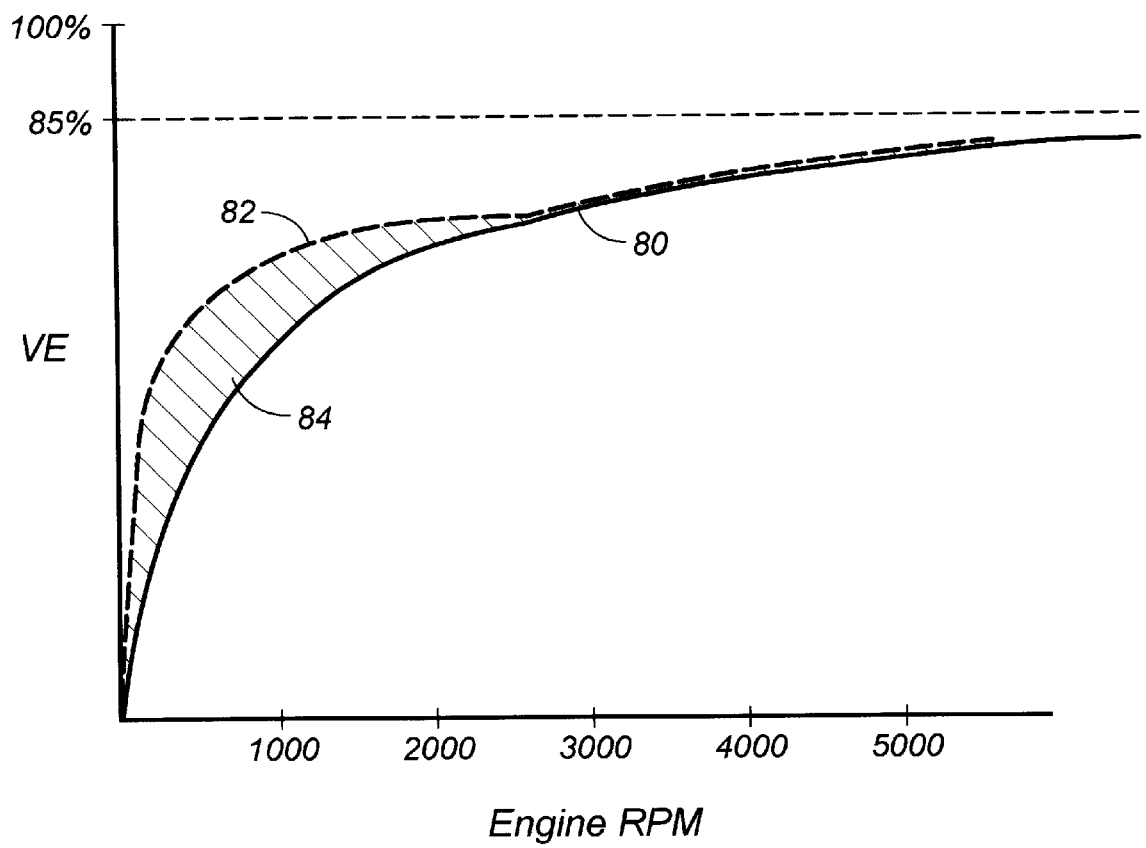
FIG. 7 is a graph of engine r.p.m. versus volumetric efficiency showing the contrast between the conventional throttle and the present invention.

FIG. 7 shows a graph illustrating the improved volumetric efficiency associated with the throttle apparatus of the present invention. The solid line 80 in FIG. 7 shows a graph of the volumetric efficiency of a standard throttle apparatus. The broken line 82 shows the volumetric efficiency associated with the throttle apparatus illustrated in FIGS. 4–6. As can be seen, the volumetric efficiency of the engine is greatly improved at low r.p.m.'s as opposed to the existing engine. The cross-hatched lines 84 are illustrative of the improvement of volumetric efficiency associated with the present invention. It can be seen that the volumetric efficiency of the present invention improves substantially at low engine speeds while not reducing efficiency at higher engine speeds. Having greater volumetric efficiency at low speeds, the vehicle will have much faster acceleration at low speeds, greater fuel economy at low speeds, and a much completer combustion of the fuel at low speeds. As such, the present invention greatly improves the working capability of the engine at such low speeds.

Figure 8:
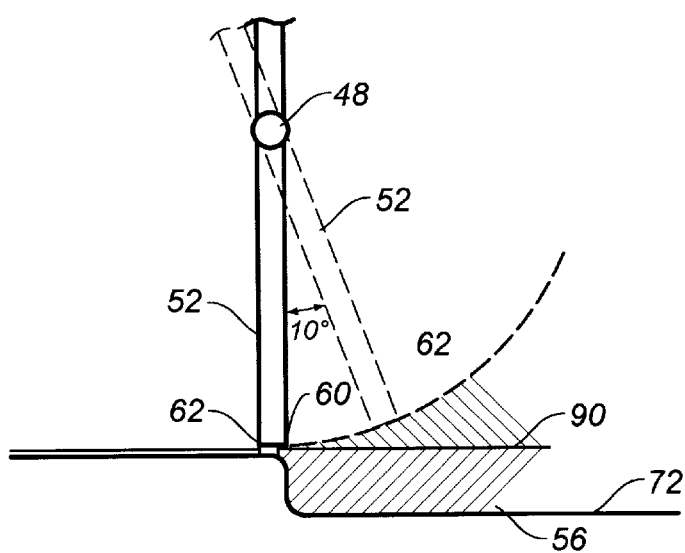
FIG. 8 is a detailed illustration showing the movement of the disk relative to the present invention and relative to existing throttle configurations.

FIG. 8 is illustrative of how the disk 52 can be pivoted about its axle 48 so as to improve the amount of air which ultimately flows to the engine through the manifold. In the closed first position, the disk 52 prevents air flow from passing between the periphery 62 and the seat 60. When the accelerator pedal is pressed slightly, the disk 52 will move by ten degrees to the position illustrated in broken line fashion in FIG. 8. The channel 56 of the present invention is illustrated in FIG. 8 in solid line fashion. The straight air flow passageway associated with standard throttle bodies is illustrated by the broken line 90 of FIG. 8. It can be seen from the cross-hatched lines that a much greater volume of air can flow between the periphery 62 of the disk 52 and the wall 72 of the throttle body 42 by the use of the channel 56. The amount of air that can flow between this space is much less with conventional throttle bodies. The use of the multiple channels 56 allows a great volume of air to be sucked through the space between the periphery 62 of the disk 52 and the wall 72 of the throttle body. In this manner, the present invention greatly improves the volumetric efficiency of the throttle mechanism, and thus, the engine.

Figure 9:
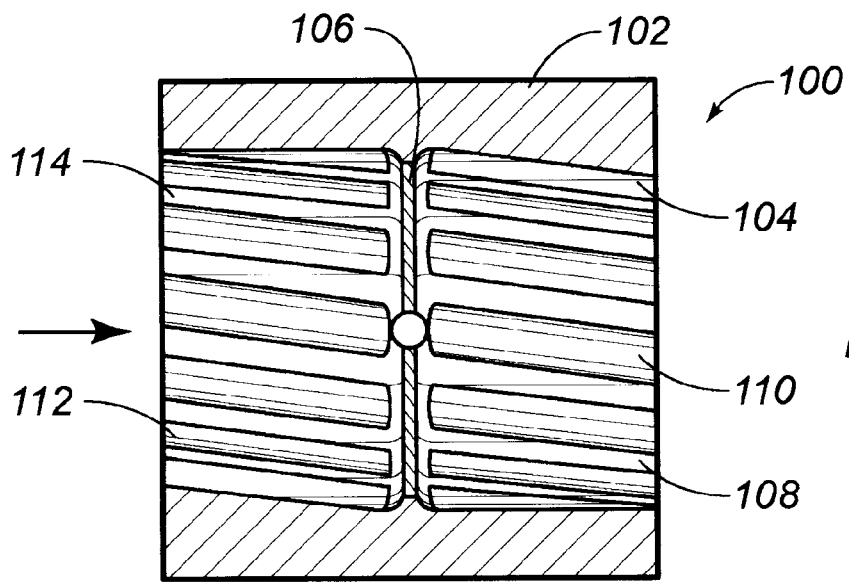
FIG. 9 is a cross-sectional view showing a throttle apparatus in accordance with an alternative embodiment of the present invention.

FIG. 9 illustrates an alternative embodiment 100 of the present invention. The embodiment 100 includes a throttle body 102 having an air flow passageway 104 formed therein. It can be seen that the disk 106 extends across the air flow passageway 104 in the manner described herein previously. In FIG. 9, it can be seen that the channels 108 formed on the section 110 of the air flow passageway 104 are of a generally helical configuration. Similarly, such spiral-shaped channels 112 are also formed on the first side 114 of the air flow passageway 104. This "helical" arrangement of channels 110 and 112 will create a "rifling" effect of the air flow and can possibly improve the air flow through the air flow passageway 100.

Figure 10:
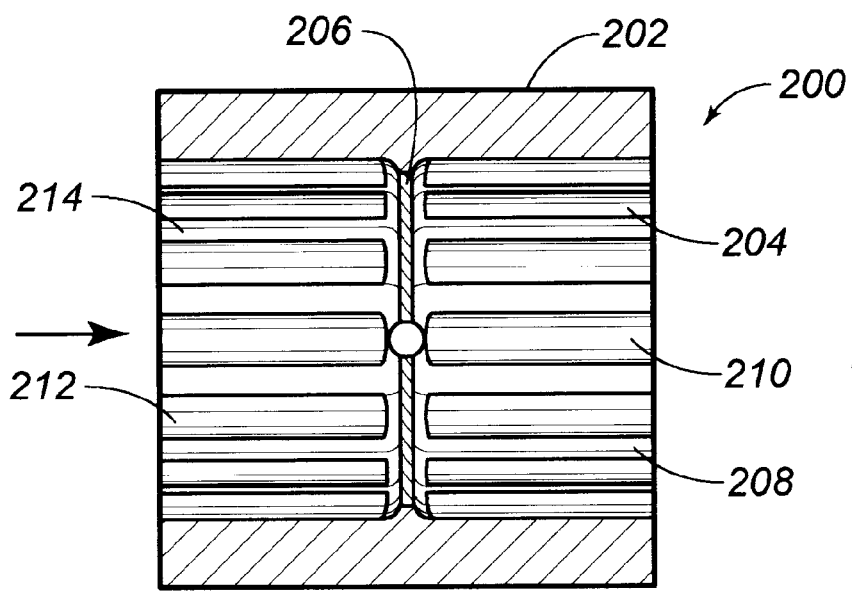
FIG. 10 is a cross-sectional view of another throttle apparatus in accordance with another alternative embodiment of the present invention.

FIG. 10 shows another alternative embodiment 200 of the present invention. Alternative embodiment 200 includes a throttle body 202 having an air flow passageway 204. The disk 206 is pivotally mounted within the air flow passageway 204 in the manner described herein previously. In FIG. 10, it can be seen that a plurality of straight channels 208 are arranged in the first section 210 of the air flow passageway 204. Similarly, a plurality of straight longitudinally aligned and parallel channels 212 are arranged in the other section of the air flow passageway 204. In this configuration of the present invention, it appears that the straight channels may improve the flow characteristics of the air passing therethrough. In all of these cases, it can be seen that the ends of each of the channels terminate at so as to be separate from but adjacent to the seat associated with the disk 206.

The present invention provides greater volumes of air with smaller openings. Generally, the vehicle will move forward with the introduction of air into the manifold. The present invention serves to move more air into the cylinders so as to increase piston pressures. This allows the car to move immediately. It also increases the flow of fuel. The present invention takes in more air at greater volumes. When the blade is opened above the seat, the present invention allows for an exponentially increased amount of air flow. As such, cylinder filling is improved. The present invention is able to extract more BTU's out of the air/fuel charge than with existing throttle bodies.

Although it is not completely understood why the present invention creates such a great improvement in volumetric efficiency, it is believed that the "variable orifice" effect caused by the present invention somehow increases the density of air flow into the manifold and, eventually, into the cylinder. In the present invention, the cross section of the venturi is constantly varied. This venturi effect is known to improve acceleration.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A throttle apparatus comprising:
   a throttle body having an air passageway extending therethrough, said passageway having a longitudinal axis, said throttle body having a wall extending around said passageway;
   an axle rotatably mounted in said throttle body, said axle adapted to rotate in relation to a movement of an accelerator pedal, said axle extending across said passageway transverse to said longitudinal axis of said passageway;
   a disk affixed to said axle so as to pivot relative to the rotation of said axle, said disk movable between a first position adapted to block an air flow through said passageway and a variable second position adapted to allow air flow through said passageway; and
   a plurality of channels formed in said wall of said throttle body, each of said plurality of channels having an end separate from and adjacent to said disk when said disk is in said first position, said plurality of channels formed in said wall on one side of said disk; and
   a seat formed in said passageway of said throttle body, said seat extending radially inwardly from said wall, said seat extending circumferentially around said disk in said first position, said disk having a circular configuration, said seat having an annular configuration, said disk in generally sealing contact with said seat in said first position, each of said plurality of channels having said end immediately extending from said seat.

2. The apparatus of claim 1, said disk defining a first section and a second section of said air passageway when said disk is in said first position, said first section adapted to receive the air flow prior to passing by said disk into said second section, said channel being formed in said second section.

3. The apparatus of claim 2, said plurality of channels extending longitudinally along said second section, said plurality of channels having a bottom extending into said wall, said second section having a circumference around the bottoms of said plurality of channels of greater length than a circumference of said air passageway in said first section.

4. The apparatus of claim 3, said plurality of channels arranged in spaced parallel relationship to each other.

5. The apparatus of claim 3, each of said plurality of channels having a semi-circular cross-section, said plurality of channels arranged at spaced radial locations on said wall.

6. The apparatus of claim 3, further comprising:
   another plurality of channels extending longitudinally along said first section, each of said another plurality of channels in said first section having an end adjacent to and separate from said disk when in said first position.

7. The apparatus of claim 2, said plurality of channels comprising:
   a first plurality of channels formed in said wall of said second section, said first plurality of channels extending in a generally spiral pattern.

8. The apparatus of claim 7, said plurality of channels further comprising:

a second plurality of channels formed in said wall in said first section, said second plurality of channels being of a generally helical configuration.

9. The apparatus of claim 1, said disk being movable to a position offset from a transverse of said passageway by five to ten degrees, said plurality of channels adapted to pass more than five percent more air through said air passageway when said disk is ten degrees offset than when said disk is five degrees offset.

10. The apparatus of claim 1, said disk being angularly displaceable about said axle so as to allow a controlled amount of air flow through a space between a periphery of said disk and a wall of said air passageway.

11. The apparatus of claim 1, said air passageway having a greater cross-sectional area on said one side of said disk than on an opposite side of said disk.

12. The apparatus of claim 1, said throttle body further comprising:

another air passageway extending therethrough, said another air passageway having a longitudinal axis in parallel and spaced relationship to said longitudinal axis of said air passageway, said axle extending across said another air passageway transverse to said longitudinal axis of said another air passageway;

a second disk affixed to said axle so as to pivot in coordination with said first disk; and a plurality of channels formed in a wall of each of said another air passageway, said plurality of channels of said another air passageway having an end separate from and adjacent to said second disk.

13. A throttle apparatus comprising:

a throttle body having an air passageway extending therethrough, said passageway having a longitudinal axis, said throttle body having a wall extending around said passageway;

an axle rotatably mounted in said throttle body, said axle adapted to rotate in relation to a movement of an accelerator pedal, said axle extending across said passageway transverse to said longitudinal axis of said passageway;

a disk affixed to said axle so as to pivot relative to the rotation of said axle, said disk movable between a first position adapted to block an air flow through said passageway and a variable second position adapted to allow air flow through said passageway; and a plurality of channels formed in said wall of said throttle body, each of said plurality of channels having an end separate from and adjacent to said disk when said disk is in said first position, said plurality of channels formed in said wall on one side of said disk, said disk defining a first section and a second section of said air passageway when said disk is in said first position, said first section adapted to receive the air flow prior to passing by said disk into said second section, said plurality of channels extending longitudinally along said second section, said plurality of channels having a bottom extending into said wall, said second section having a circumference around the bottoms of said plurality of channels of greater length than a length of a circumference of said air passageway in said first section, said plurality of channels arranged entirely around said air passageway of said second section.

14. A throttle apparatus comprising:

a throttle body having an air passageway extending therethrough, said passageway having a longitudinal axis, said throttle body having a wall extending around said passageway;

an axle rotatably mounted in said throttle body, said axle adapted to rotate in relation to a movement of an accelerator pedal, said axle extending across said passageway transverse to said longitudinal axis of said passageway;

a disk affixed to said axle so as to pivot relative to the rotation of said axle, said disk movable between a first position adapted to block an air flow through said passageway and a variable second position adapted to allow air flow through said passageway; and a plurality of channels formed in said wall of said throttle body, each of said plurality of channels having an end separate from and adjacent to said disk when said disk is in said first position, said plurality of channels formed in said wall on one side of said disk, said disk opening onto said plurality of channels upon a one degree rotation of said axle.

* * * * *